(12) United States Patent
Ono

(10) Patent No.: US 8,736,884 B2
(45) Date of Patent: May 27, 2014

(54) IMAGE PROCESSOR AND NON-TRANSITORY STORAGE MEDIUM STORING PROGRAM

(75) Inventor: Takatoshi Ono, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 63 days.

(21) Appl. No.: 13/617,302

(22) Filed: Sep. 14, 2012

(65) Prior Publication Data

US 2013/0100474 A1 Apr. 25, 2013

(30) Foreign Application Priority Data

Oct. 24, 2011 (JP) ................................ 2011-232989

(51) Int. Cl.
*G06F 3/12* (2006.01)

(52) U.S. Cl.
USPC .......... 358/1.15; 358/1.13; 358/1.9; 358/1.16

(58) Field of Classification Search
CPC ... G06F 3/1257; G06F 3/1253; G06F 3/1204; G03G 15/502
USPC ................................................ 358/1.13–1.16
See application file for complete search history.

(56) References Cited

U.S. PATENT DOCUMENTS

| 5,726,883 | A | 3/1998 | Levine et al. |
| 7,242,498 | B2 | 7/2007 | Fujiwara |
| 7,929,157 | B2 | 4/2011 | Nakagiri |
| 7,991,317 | B2 | 8/2011 | Kato et al. |
| 8,405,856 | B2 * | 3/2013 | Do et al. ...................... 358/1.15 |
| 2003/0066027 | A1 | 4/2003 | Nakagiri |
| 2003/0107758 | A1 | 6/2003 | Fujiwara |
| 2003/0160774 | A1 * | 8/2003 | Minagawa ..................... 345/204 |

(Continued)

FOREIGN PATENT DOCUMENTS

| JP | 9-37001 A | 2/1997 |
| JP | H09-179801 A | 7/1997 |

(Continued)

OTHER PUBLICATIONS

Japanese Official Action dated May 7, 2013 received from the Japanese Patent Office in related application JP 2013-018121 corresponding to U.S. Appl. No. 13/726,945, together with an English language translation.

(Continued)

*Primary Examiner* — Dennis Dicker
(74) *Attorney, Agent, or Firm* — Scully, Scott, Murphy & Presser, PC

(57) ABSTRACT

An image processor includes a display. The display displays a preset-setting-group selection screen containing a plurality of icons respectively corresponding to preset-setting groups such that one icon is displayed in a manner indicative of a selected state while at least one icon other than the one icon is displayed in a manner that is indicative of an unselected state. When any of set values of a preset-setting group corresponding to the one icon having been displayed in the manner indicative of the selected state, the display displays a preset-setting-group-updated screen containing the one icon displayed in the manner indicative of the selected state on the preset-setting-group selection screen and not containing the at least one icon in the manner indicative of the unselected state on the preset-setting-group selection screen.

19 Claims, 8 Drawing Sheets

(56) References Cited

U.S. PATENT DOCUMENTS

| | | | |
|---|---|---|---|
| 2004/0205169 A1* | 10/2004 | Machida | 709/220 |
| 2006/0136992 A1* | 6/2006 | Shigeeda | 726/2 |
| 2008/0199199 A1 | 8/2008 | Kato et al. | |
| 2009/0046057 A1 | 2/2009 | Umezawa | |
| 2009/0316180 A1 | 12/2009 | Nakagawa | |
| 2010/0211963 A1* | 8/2010 | Suwabe | 719/327 |
| 2010/0212023 A1* | 8/2010 | Asahara | 726/27 |
| 2011/0007351 A1* | 1/2011 | Kurumasa et al. | 358/1.15 |
| 2011/0194144 A1 | 8/2011 | Shigenobu | |
| 2011/0199629 A1 | 8/2011 | Sensu et al. | |

FOREIGN PATENT DOCUMENTS

| | | |
|---|---|---|
| JP | 11-215283 A | 8/1999 |
| JP | 2003-91384 A | 3/2003 |
| JP | 2003-202973 A | 7/2003 |
| JP | 2005-7579 A | 1/2005 |
| JP | 2007-148909 A | 6/2007 |
| JP | 2007-300289 A | 11/2007 |
| JP | 2008-176601 A | 7/2008 |
| JP | 2008-210383 A | 9/2008 |
| JP | 2009-70365 A | 4/2009 |
| JP | 2009-98966 A | 5/2009 |
| JP | 2010-3167 A | 1/2010 |
| JP | 2011-164726 A | 8/2011 |
| JP | 2011164835 A | 8/2011 |
| JP | 2011232971 A | 11/2011 |

OTHER PUBLICATIONS

Notification of Reason for Refusal dated Oct. 15, 2013 from related Japanese Application No. JP 2013-018121, corresponding to U.S. Appl. No. 13/726,945, together with English translation.

* cited by examiner

IMAGE PROCESSOR AND NON-TRANSITORY STORAGE MEDIUM STORING PROGRAM

CROSS REFERENCE TO RELATED APPLICATION

The present application claims priority from Japanese Patent Application No. 2011-232989, which was filed on Oct. 24, 2011, the disclosure of which is herein incorporated by reference in its entirety.

BACKGROUND OF THE INVENTION

1. Field of the Invention

The present invention relates to an image processor and a non-transitory storage medium storing a program executed by a computer of the image processor.

2. Description of the Related Art

There is conventionally known a multifunction peripheral (hereinafter may be referred to as "MFP") provided with a touch panel display as a multifunction peripheral having various functions such as a printing function, a scanning function, a copying function, and a facsimile function. Using these functions, a user can operate the touch panel display to change parameters of available setting items.

Because it is laborious to individually change the parameters, some multifunction peripherals provide some preset-setting groups for setting items that are used relatively frequently.

In such a multifunction peripheral, desirable set values for the respective setting items are set in advance for each possible use of the multifunction peripheral such as text printing and photo printing. It is noted that the set values include parameters. A group or groups of the set values of the respective setting items are stored as a preset-setting group in a storage device, e.g., a non-transitory memory. When the user selects one of the preset-setting groups, the selected preset-setting group is read out from the non-transitory memory and later used for image processing.

Another multifunction peripheral has a function to allow the user to change set values of some of the setting items individually after selecting one of the preset-setting groups. In such a multifunction peripheral, the user can easily set most of the setting items only by selecting the preset-setting group, and the user can change the set values of some of the setting items as needed.

SUMMARY OF THE INVENTION

In the above-described multifunction peripheral, however, when an unintended preset-setting group is mistakenly selected after an update on some setting items of another preset-setting group, settings of the preset-setting group selected by the misoperation unfortunately become latest or current settings.

In a case where the user wants to restore the settings to the former ones applied just before the misoperation, the user needs to select the previous preset-setting group and update some of the setting items again, which is highly laborious for the user.

It is noted that this problem can arise not only in print settings of the multifunction peripheral but also in scan settings and facsimile settings of the multifunction peripheral. This problem can also arise in print settings of a printer having a printing function and in scan settings of a scanner having a scanning function.

This invention has been developed to prevent a user from mistakenly selecting an unintended preset-setting group after an update of some setting items of another preset-setting group.

The present invention provides an image processor comprising: an image processing mechanism including at least one of an image reading mechanism configured to read an image formed on a document and an image forming mechanism configured to form an image on a recording medium; a display configured to display an image thereon; a preset-setting-group storage device configured to store a plurality of preset-setting groups each of which is a group of a plurality of settings for image processing executed by the image processing mechanism; a preset-setting-group-selection-screen display controller configured to control the display to display a plurality of icons respectively corresponding to the plurality of preset-setting groups such that one icon of the plurality of icons is displayed in a manner indicative of a selected state while at least one icon of the plurality of icons other than the one icon is displayed in a manner that is indicative of an unselected state and that is different from the manner indicative of the selected state; a selected-state change section configured to control the display such that a display manner of the one icon is changed from the manner indicative of the selected state to the manner indicative of the unselected state when having received a user operation for instructing that a display manner of one icon having been displayed in the manner indicative of the unselected state be changed to the manner indicative of the selected state; a detailed-setting-screen display controller configured, when having received a user operation for displaying set values of one of the plurality of preset-setting groups, to control the display to display a detailed setting screen that contains set values of a preset-setting group corresponding to the icon having been displayed in the manner indicative of the selected state; a set-value storage controller configured, when having received a user operation for changing at least one of the set values of the preset-setting group displayed on the display, to store the at least one changed set value into a storage unit; a preset-setting-group-updated-screen display controller configured, when the set-value storage controller has stored the at least one changed set value, to: control the display to display the one icon displayed by the preset-setting-group-selection-screen display controller in the manner indicative of the selected state; and control the display not to display the at least one icon displayed by the preset-setting-group-selection-screen display controller in the manner indicative of the unselected state; and an image-processing-mechanism controller configured, when having received a user operation for a start button in the state in which the one icon is displayed on the display by the preset-setting-group-updated-screen display controller, to execute the image processing by controlling the image processing mechanism according to the at least one changed set value and at least one original set value among the set values of the preset-setting group corresponding to the one icon displayed on the display, wherein each of the at least one original set value is a value which has not been changed by the user operation for changing at least one of the set values.

The present invention also provides an image processor, comprising: an image processing mechanism including at least one of an image reading mechanism configured to read an image formed on a document and an image forming mechanism configured to form an image on a recording medium; a display configured to display an image thereon; a preset-setting-group storage device configured to store a plurality of preset-setting groups each of which is a group of a plurality of settings for image processing executed by the image processing mechanism; a preset-setting-group-selection-screen display controller configured to control the display to display a plurality of icons respectively corresponding to the plurality of preset-setting groups such that one icon of the plurality of icons is displayed in a manner indicative of a selected state while at least one icon of the plurality of icons other than the one icon is displayed in a manner that is indicative of an unselected state and that is different from the manner indicative of the selected state; a selected-state change section configured to control the display such that a display manner of the one icon is changed from the manner indicative of the selected state to the manner indicative of the unselected state when having received a user operation for instructing that a display manner of one icon having been displayed in the manner indicative of the unselected state be changed to the manner indicative of the selected state; a detailed-setting-screen display controller configured, when an output signal for displaying set values of one of the plurality of preset-setting groups is outputted, to control the display to display set values of a preset-setting group corresponding to the icon having been displayed in the manner indicative of the selected state; a set-value storage controller configured, when an output signal for changing at least one of the set values of the preset-setting group displayed on the display is outputted, to store the at least one changed set value into a storage unit; a preset-setting-group-updated-screen display controller configured, when the set-value storage controller has stored the at least one changed set value, to: control the display to display the one icon displayed by the preset-setting-group-selection-screen display controller in the manner indicative of the selected state; and control the display not to display the at least one icon displayed by the preset-setting-group-selection-screen display controller in the manner indicative of the unselected state; and an image-processing-mechanism controller configured, when an output signal indicating a user operation for a start button is outputted in the state in which the one icon is displayed on the display by the preset-setting-group-updated-screen display controller, to execute the image processing by controlling the image processing mechanism according to the at least one changed set value and at least one original set value among the set values of the preset-setting group corresponding to the one icon displayed on the display, wherein each of the at least one original set value is a value which has not been changed by the user operation for changing at least one of the set values.

The present invention also provides a non-transitory storage medium storing a program executed by a computer of an image processor comprising an image processing mechanism including at least one of an image reading mechanism configured to read an image formed on a document and an image forming mechanism configured to form an image on a recording medium, the program designed to have the computer function as: a preset-setting-group storage device configured to store a plurality of preset-setting groups each of which is a group of a plurality of settings for image processing executed by the image processing mechanism; a preset-setting-group-selection-screen display controller configured to control a display to display a plurality of icons respectively corresponding to the plurality of preset-setting groups such that one icon of the plurality of icons is displayed in a manner indicative of a selected state while at least one icon of the plurality of icons other than the one icon is displayed in a manner that is indicative of an unselected state and that is different from the manner indicative of the selected state; a selected-state change section configured to control the display such that a display manner of the one icon is changed from the manner indicative of the selected state to the manner indicative of the unselected state when having received a user operation for instructing that a display manner of one icon having been displayed in the manner indicative of the unselected state be changed to the manner indicative of the selected state; a detailed-setting-screen display controller configured, when having received a user operation for displaying set values of one of the plurality of preset-setting groups, to control the display to display set values of a preset-setting group corresponding to the icon having been displayed in the manner indicative of the selected state; a set-value storage controller configured, when having received a user operation for changing at least one of the set values of the preset-setting group displayed on the display, to store the at least one changed set value into a storage unit; a preset-setting-group-updated-screen display controller configured, when the set-value storage controller has stored the at least one changed set value, to: control the display to display the one icon displayed by the preset-setting-group-selection-screen display controller in the manner indicative of the selected state; and control the display not to display the at least one icon displayed by the preset-setting-group-selection-screen display controller in the manner indicative of the unselected state; and an image-processing-mechanism controller configured, when having received a user operation for a start button in the state in which the one icon is displayed on the display by the preset-setting-group-updated-screen display controller, to execute the image processing by controlling the image processing mechanism according to the at least one changed set value and at least one original set value among the set values of the preset-setting group corresponding to the one icon displayed on the display, wherein each of the at least one original set value is a value which has not been changed by the user operation for changing at least one of the set values.

The present invention also provides a non-transitory storage medium storing a program executed by a computer of an image processor comprising an image processing mechanism including at least one of an image reading mechanism configured to read an image formed on a document and an image forming mechanism configured to form an image on a recording medium, the program designed to have the computer function as a preset-setting-group storage device configured to store a plurality of preset-setting groups each of which is a group of a plurality of settings for image processing executed by the image processing mechanism; a preset-setting-group-selection-screen display controller configured to control a display to display a plurality of icons respectively corresponding to the plurality of preset-setting groups such that one icon of the plurality of icons is displayed in a mariner indicative of a selected state while at least one icon of the plurality of icons other than the one icon is displayed in a manner that is indicative of an unselected state and that is different from the manner indicative of the selected state; a selected-state change section configured to control the display such that a display manner of the one icon is changed from the manner indicative of the selected state to the manner indicative of the unselected state when having received a user operation for instructing that a display manner of one icon having been displayed in the manner indicative of the unselected state be changed to the manner indicative of the selected state; a detailed-setting-screen display controller configured, when an output signal for displaying set values of one of the plurality of preset-setting groups is outputted, to control the display to display set values of a preset-setting group corresponding to the icon having been displayed in the manner indicative of the selected state; a set-value storage controller configured, when an output signal for changing at least one of the set values of the preset-setting group displayed on the display is outputted, to store the at least one changed set value into a storage unit; a preset-setting-group-updated-screen display controller configured, in a case where the set-value storage controller has stored the at least one changed set value, to: control the display to display the one icon displayed by the preset-setting-group-selection-screen display controller in the manner indicative of the selected state; and control the display not to display the at least one icon displayed by the preset-setting-group-selection-screen display controller in the manner indicative of the unselected state; and an image-processing-mechanism controller configured, when an output signal indicating a user operation for a start button is outputted in the state in which the one icon is displayed on the display by the preset-setting-group-updated-screen display controller, to execute the image processing by controlling the image processing mechanism according to the at least one changed set value and at least one original set value among the set values of the preset-setting group corresponding to the one icon displayed on the display, wherein each of the at least one original set value is a value which has not been changed by the user operation for changing at least one of the set values.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which.

DETAILED DESCRIPTION OF THE EMBODIMENTS

Hereinafter, there will be described embodiments of the present invention with reference to some examples.

[1] First Embodiment

<Configuration of Multifunction Peripheral>

Figure 1A:
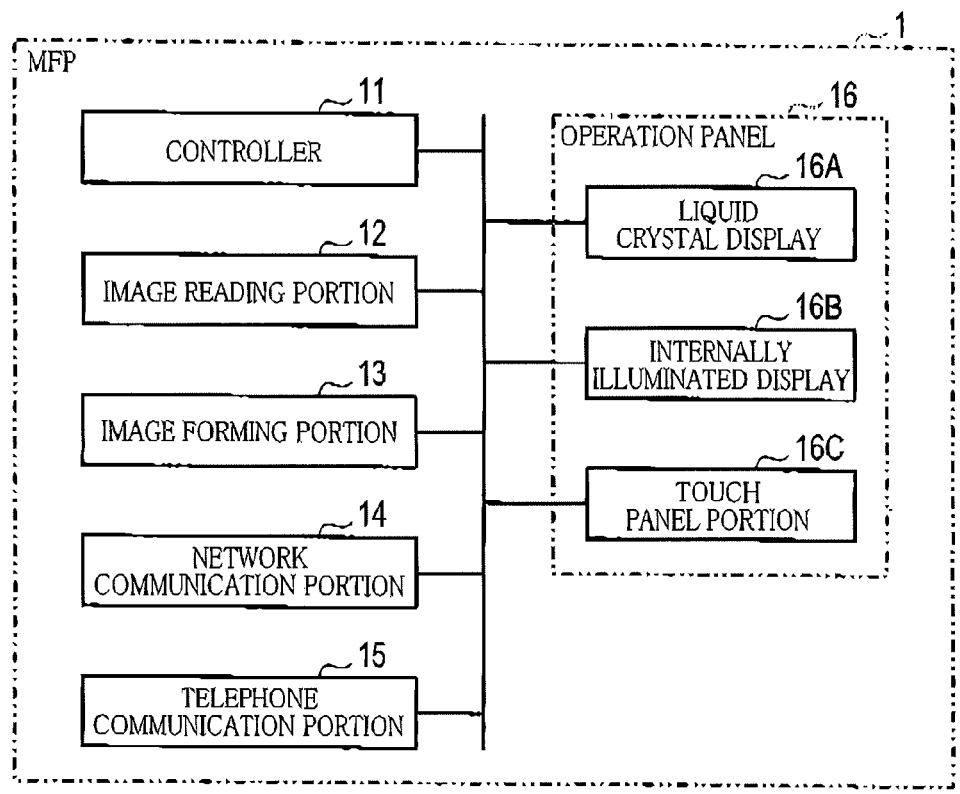
FIG. 1A is a block diagram showing an internal structure of a multifunction peripheral.

As shown in FIG. 1, a multifunction peripheral 1 includes a controller 11, an image reading portion 12, an image forming portion 13, a network communication portion 14, a telephone communication portion 15, and an operation panel 16.

The controller 11 is mainly constituted by a well-known microcomputer including a CPU, a ROM, a RAM, and a NVRAM. In this controller 11, the CPU executes various processings, which will be described below, according to programs stored in the ROM, and thereby components of the MFP 1 are controlled.

The image reading portion 12 includes an image sensor and an automatic document feeder (hereinafter may be referred to as "ADF"). The image sensor reads an image on a document conveyed by the ADF or a document placed on a flatbed platen glass, whereby the image reading portion 12 creates image data representative of the image. The image forming portion 13 is in the form of an image forming mechanism of an inkjet type or an electronic photographic type and capable of recording an image on a recording medium such as a recording sheet.

The network communication portion 14 is in the form of a network interface card (hereinafter may be referred to as "NIC"), for example. The telephone communication portion 15 is constituted by a modem and other components to communicate using a telephone line, not shown.

The operation panel 16 includes a liquid crystal display 16A, an internally illuminated display 16B, and a touch panel portion 16C. The liquid crystal display 16A is a LCD module which is capable of displaying an image in full color. Images (e.g., icons and user operation buttons) and texts indicating various information are displayed dynamically on the liquid crystal display 16A according to an operation status.

Figure 1B:
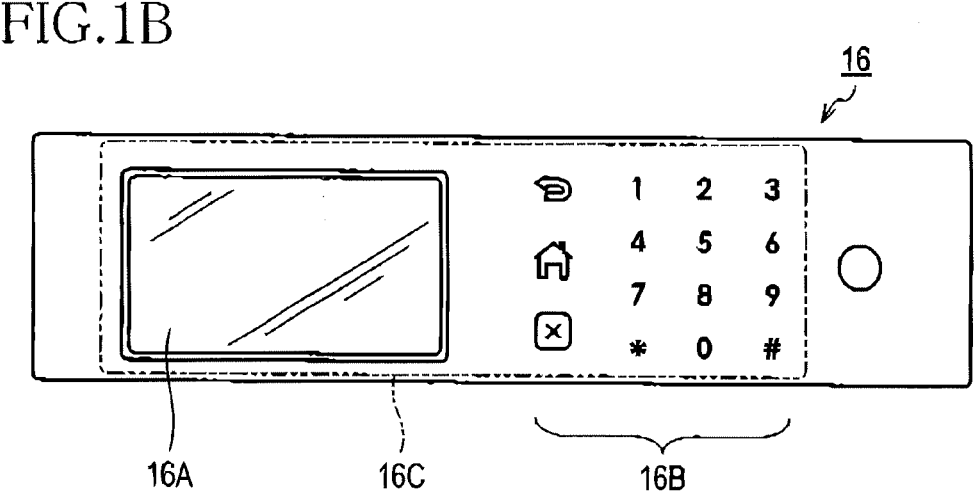
FIG. 1D shows a schematic view of an operation panel of the multifunction peripheral.

As shown in FIG. 1B, the internally illuminated display 16B is an area on which images indicating a numeric keypad and some user operation buttons are displayed. This internally illuminated display 16B has a front panel which is provided with light transmitting portions associated in position with the respective images. Light emitting elements are provided on the back of the respective light transmitting portions, and when these light emitting elements emit lights, the images are lit in their respective predetermined colors. It is noted that a display surface of the liquid crystal display 16A is flush with that of the internally illuminated display 16B.

The touch panel portion 16C is a transparent film-like input device that can detect a touch operation or action of an input object such as a finger and a stylus. This touch panel portion 16C is of a well-known type such as an electrostatic capacitance type and superposed on the display surfaces of the liquid crystal display 16A and the internally illuminated display 16B. In the present embodiment, when the touch panel portion 16C detects the touch operation, an output signal indicative of the touch position or positions is outputted from the touch panel portion 16C to the controller 11. The controller 11 based on the output signal judges a type of the detected touch operation. Types of the touch operation include: a slide such as a drag and a flick; a tap such as a single tap and a double tap; and a pinch. The controller 11 also judges whether the location of the touch operation is within an area overlaying the display surface of the liquid crystal display 16A and whether the location overlaps any of the images displayed on the internally illuminated display 16B. The controller 11 executes a processing that corresponds to the type and location of the touch operation.

<Overview of Screen Transition Triggered by Touch Operation>

Figure 2A:
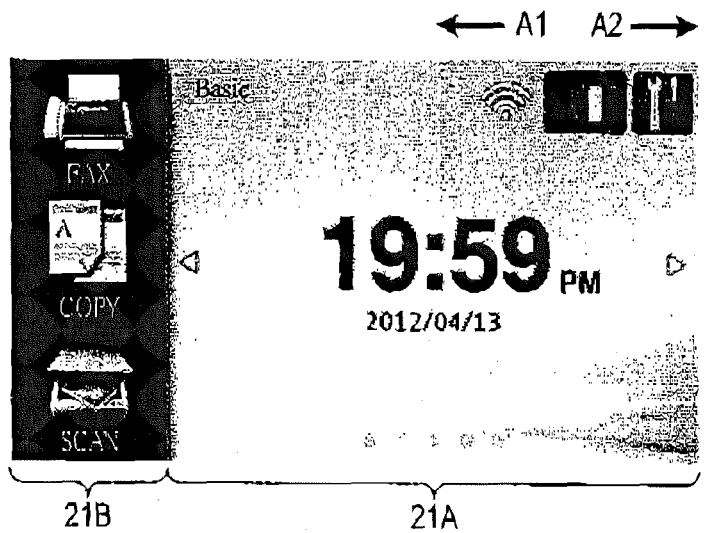
FIGS. 2A-2C are views for explaining screens displayed on a liquid crystal display.

There will be next explained an overview of screen transitions triggered by touch operations performed on the operation panel 16 of the MFP 1. As shown in FIG. 2A, the liquid crystal display 16A has areas 21A, 21B each as a display area. When a power switch of the MFP 1 is turned on, the controller 11 displays a basic screen as shown in FIG. 2A on the area 21A.

When a user touches a triangle mark displayed on a right end portion of the area 21A or when a user slides the input object on the area 21A leftward, i.e., in a direction indicated by arrow A1 in FIG. 2A, such a user operation is received by the touch panel portion 16C and judged by the controller 11 as a user operation for scrolling images or items displayed on the area 21A leftward. The controller 11 thus scrolls the images displayed on the area 21A leftward.

When the user touches a triangle mark displayed on a left end portion of the area 21A or when a user slides the input object on the area 21A rightward, i.e., in a direction indicated by arrow A2 in FIG. 2A, such a user operation is received by the touch panel portion 16C and judged by the controller 11 as a user operation for scrolling the images displayed on the area 21A rightward. The controller 11 thus scrolls the images displayed on the area 21A rightward. It is noted that, in addition to these images, the area 21A of the basic screen contains date and time, a wireless communication status, an ink amount, a setting button, and the like.

Figure 2B:
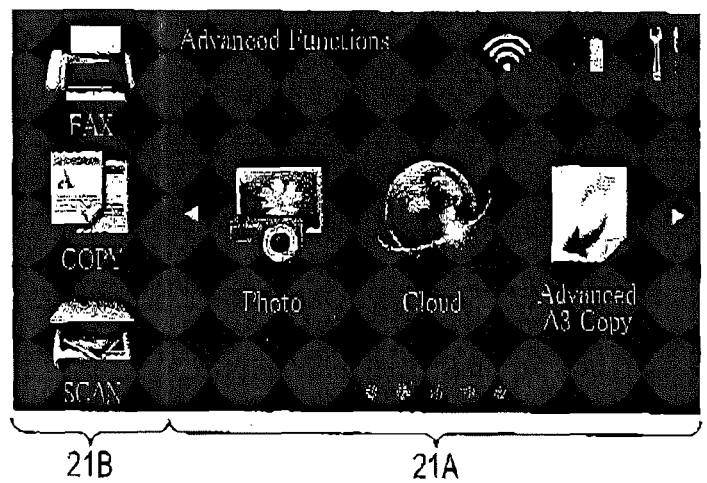

When the touch panel portion 16C receives the user operation for scrolling the images on the area 21A leftward with the basic screen displayed, the controller 11 scrolls the images displayed on the area 21A to display an advanced function screen as shown in FIG. 2B on the area 21A. It is noted that, in this scroll, the controller 11 does not scroll some items including the wireless communication status, the ink amount, and the setting button, and these items are kept displayed on the area 21A.

Figure 2C:
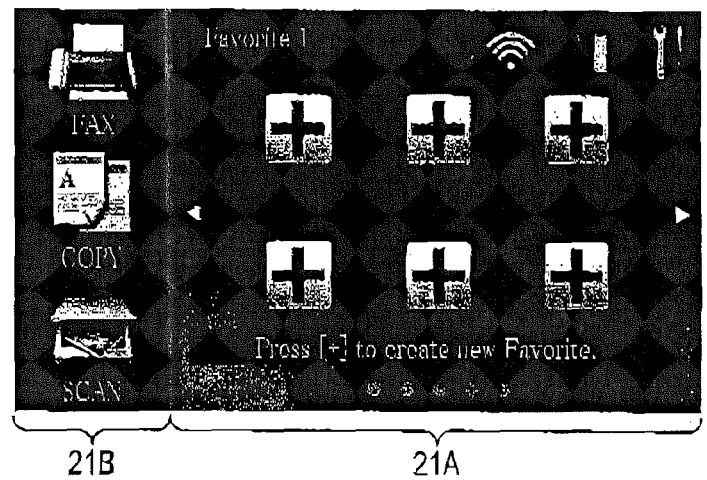

When the touch panel portion 16C receives the user operation for scrolling the images on the area 21A leftward with the advanced function screen being displayed, the controller 11 displays a "Favorite" screen as shown in FIG. 2C on the area 21A. It is noted that the "Favorite" screen includes screens generally the same as one another, namely, a "Favorite 1" screen, a "Favorite 2" screen, and a "Favorite 3" screen. When the user operation for scrolling the images on the area 21A leftward is repeated after the "Favorite 1" screen is displayed, the controller 11 displays the "Favorite 2" screen and the "Favorite 3" screen in order.

When the touch panel portion 16C receives the user operation for scrolling the images on the area 21A leftward with the "Favorite 3" screen being displayed, the controller 11 displays the basic screen. After the display of this basic screen, the above-described screen transitions are repeated in response to the user operations. That is, when the images displayed on the area 21A are scrolled leftward, the five screens including the basic screen are displayed cyclically. When the images displayed on the area 21A are scrolled rightward, the screens are displayed cyclically in reverse order.

On the left area 21B are displayed icons corresponding to functions of the MFP 1 such as a facsimile function, a copying function, and a scanning function. These icons are kept displayed on the area 21B without scrolling even when the images displayed on the area 21A are scrolled.

Figure 3A:
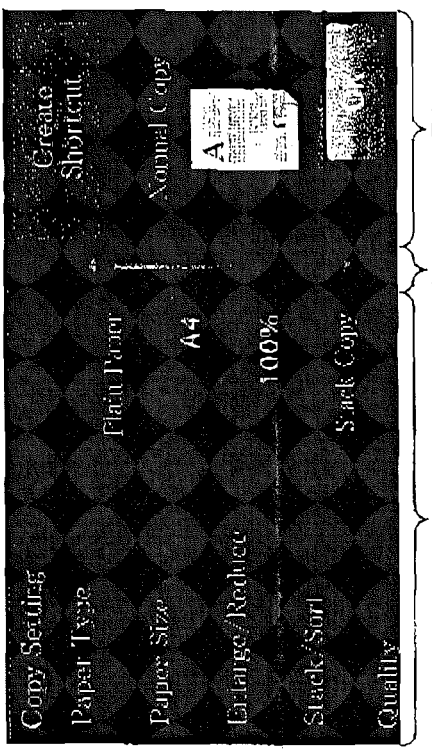
FIGS. 3A-3D are views for explaining other screens displayed on the liquid crystal display.

When the user touches one of the icons corresponding to functions of the MFP 1, the controller 11 displays a top page of the selected function on the liquid crystal display 16A. In the following description, there will be explained, by way of example, a case where the user has touched the copy icon. In this case, the controller 11 displays a preset-setting-group selection screen as shown in FIG. 3A on the liquid crystal display 16A.

In the preset-setting-group selection screen, the display area of the liquid crystal display 16A is divided into areas 25A, 25B, 25C. The upper area 25A contains various information, the intermediate area 25B contains preset-setting-group icons respectively corresponding to preset-setting groups, and the lower area 25C contains buttons including a "Detailed Settings" button, a "Black" copy start button, and a "Color" copy start button. The "Black" copy start button and the "Color" copy start button are buttons for starting copying in black and color, respectively, when pressed.

The area 25B is an area on which images thereon are scrolled in a right and left direction (i.e., directions indicated by arrows A1, A2) in response to the user operation. Specifically, when the user slides the input object on the area 25B leftward or rightward, the touch panel portion 16C receives the user operation, and the controller 11 scrolls images or icons displayed on the area 25B in a direction instructed by the user operation. With this scroll, a central icon displayed on the area 25B is highlighted so as to indicate that the icon is in a selected state. Icons in an unselected state are displayed on right and left sides of the icon in the selected state.

When the "Black" copy start button or the "Color" copy start button is touched in this state, copying is performed based on a combination of a preset setting corresponding to the icon in the selected state and a black/color setting designated by the touched start button.

Figure 3B:
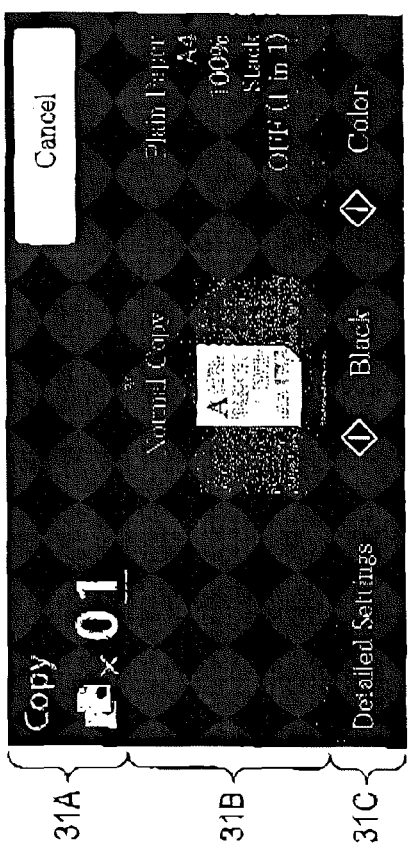

When the "Detailed Settings" button is touched with the preset-setting-group selection screen being displayed, the controller 11 displays a detailed setting screen as shown in FIG. 3B on the liquid crystal display 16A. In the detailed setting screen, the display area of the liquid crystal display 16A is divided into areas 27A, 27B, 27C. The left area 27A contains setting items and their respective set values, the central area 27B contains a scrollbar, and the right area 27C contains a "Shortcut Create" button, an "OK" button, and a preset-setting-group icon which corresponds to the preset-setting group in the selected state.

The area 27A is an area on which images or icons thereon are scrolled in an up and down direction (i.e., directions indicated by arrows A3, A4) in response to the user operation. Specifically, when the user slides the input object on the area 27A upward or downward, the touch panel portion 16C receives the user operation, and the controller 11 scrolls the images displayed on the area 27A in a direction instructed by the user operation. This scroll allows the user to view setting items located outside the display area.

Figure 3C:
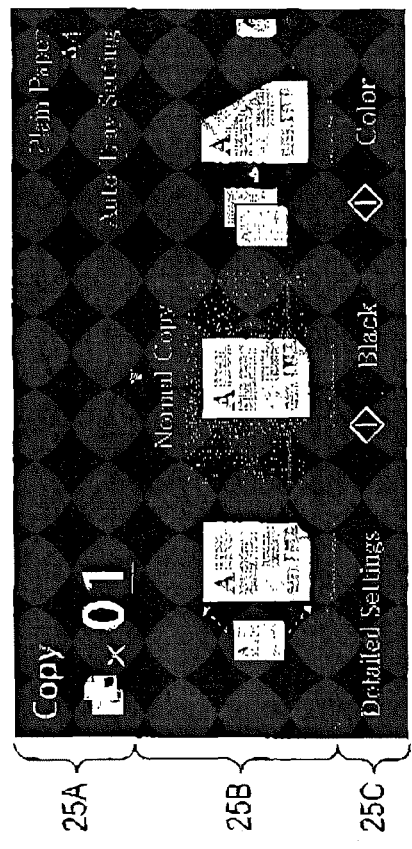

When the user touches one of the setting items in this state, the controller 11 displays, for the touched setting item, an option display screen as shown in FIG. 3C on the liquid crystal display 16A. In this option display screen, the display area of the liquid crystal display 16A is divided into areas 29A, 29B. The left area 29A contains available options for the set value of the setting item, and the right area 29B contains the "Shortcut Create" button and the icon corresponding to the preset-setting group in the selected state. It is noted that the images displayed on the right area 29B are the same as some images displayed on the area 27C in the detailed setting screen.

The option display screen shown in FIG. 3C is an option display screen for a setting item "Quality". Available options for this setting item include "Normal", "Fast", and "nest". The user can select one of these options by the touch operation, and when the touch panel portion 16C receives the user operation, the controller 11 displays the detailed setting screen shown in FIG. 3B on the liquid crystal display 16A again.

When the user touches the "OK" button on the detailed setting screen without any changes to the settings, the controller 11 displays the preset-setting-group selection screen shown in FIG. 3A on the liquid crystal display 16A again. On the other hand, when the user touches the "OK" button on the detailed setting screen after changing one or more settings, the controller 11 displays a preset-setting-group updated screen shown in FIG. 3D on the liquid crystal display 16A.

In the preset-setting-group updated screen, the display area of the liquid crystal display 16A is divided into areas 31A, 31B, 31C. The same images as used in the preset-setting-group selection screen are used for some information and buttons displayed on the areas 31A, 31B, 31C. Specifically, a copy number displayed on a left portion of the area 31A, the icon in the selected state displayed on a central portion of the area 31B, and button images displayed on the area 31C are the same as those displayed on the preset-setting-group selection screen. This creates a sense of uniformity or consistency in operability of the user for both of the screens.

Some information and images on the preset-setting-group updated screen are different from those on the preset-setting-group selection screen. For example, the area 31B contains the icon in the selected state displayed thereon but does not contain icons in the unselected state displayed thereon. Information about the set values of the setting items is displayed on a right portion of the area 31B on which no icons are displayed though some icons are displayed in the unselected state on the preset-setting-group selection screen. The information about the set values of the setting items displayed on this preset-setting-group updated screen is more than the information thereabout displayed on the preset-setting-group selection screen.

In addition, the area 31A contains a cancel button which is not displayed on the preset-setting-group selection screen. When the user touches the cancel button, the controller 11 disables operations which have been made by the user to change the settings, and the controller 11 displays the preset-setting-group selection screen shown in FIG. 3A on the liquid crystal display 16A.

As in the case of the preset-setting-group selection screen, when the "Black" copy start button or the "Color" copy start button is touched, copying is performed based on the combination of the preset setting corresponding to the icon in the selected state and the black/color setting designated by the touched start button.

It is noted that, when the user touches the "Shortcut Create" button displayed on the detailed setting screen or the option display screen, the controller 11 creates shortcut information that contains the set values of the respective setting items at this creation of the shortcut information. When the shortcut information is created, an icon corresponding to the shortcut information is registered and displayed on the "Favorite 1" screen shown in FIG. 2C. When the user touches the icon on the "Favorite 1" screen, the set values contained in the shortcut information are set as current set values even in a case where different set values have been set after the creation of the shortcut information.

<Setting Change Processing>

Figure 4:
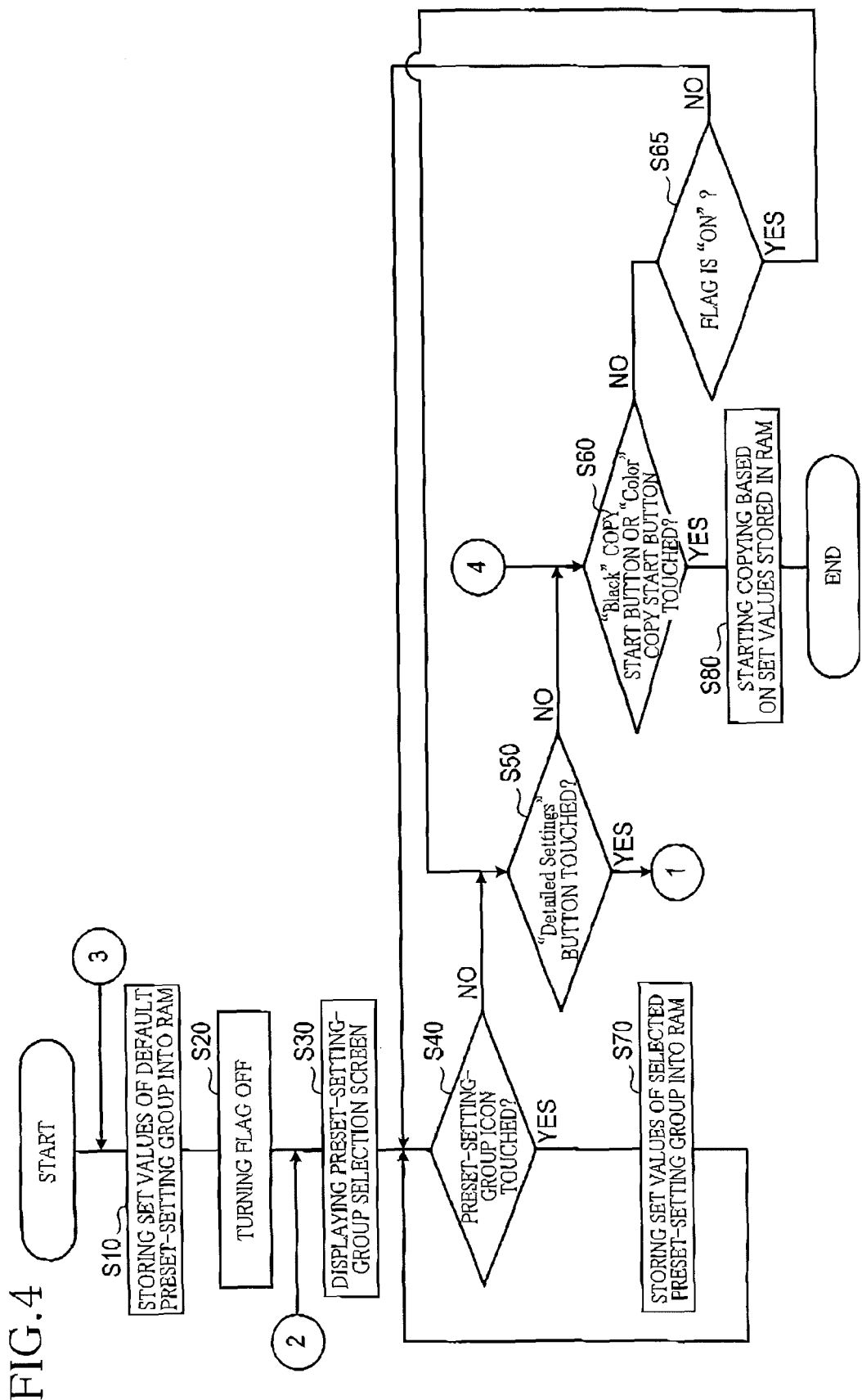
FIG. 4 is a flow chart showing a first part of a setting change processing in a first embodiment.
Figure 5:
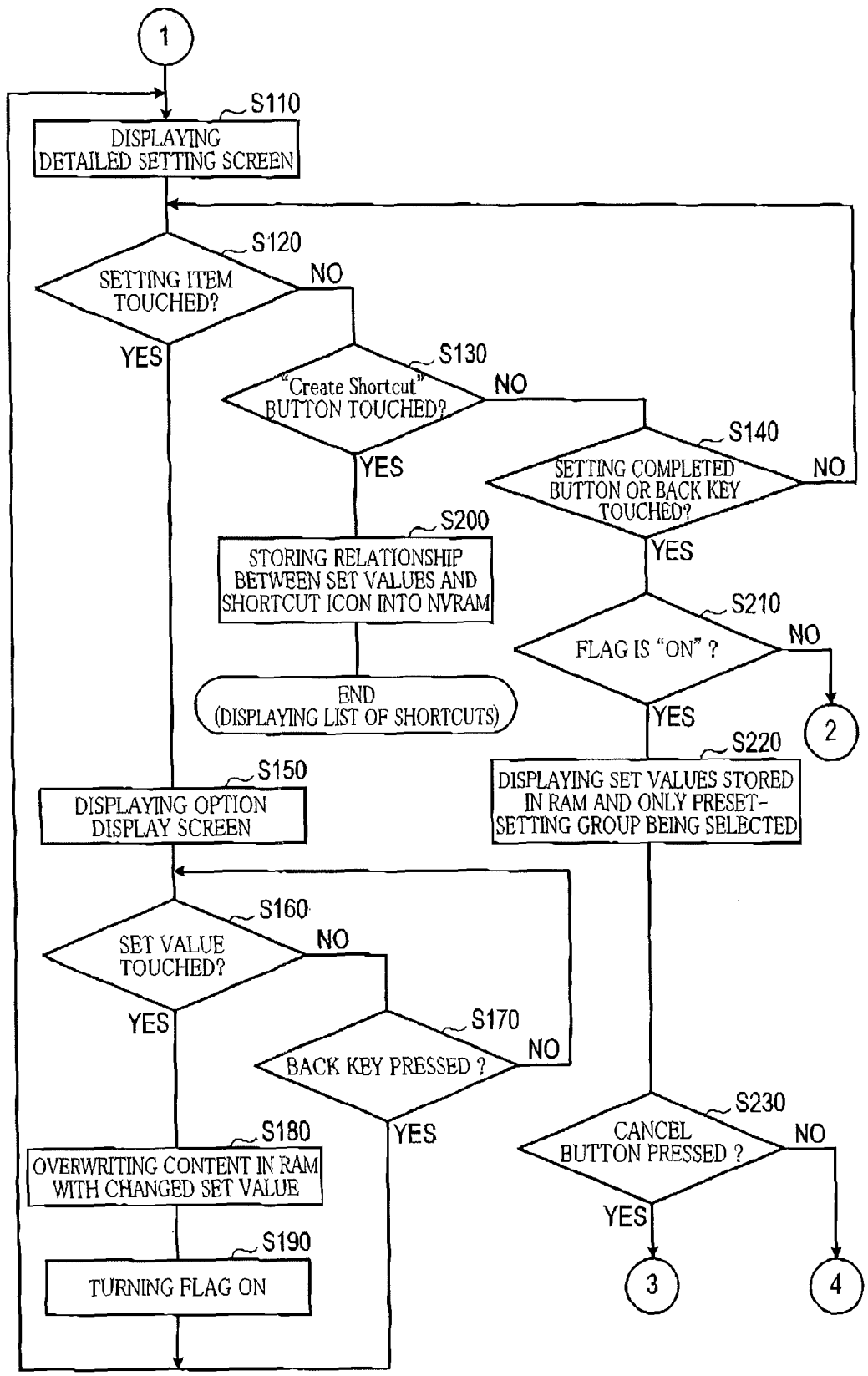
FIG. 5 is a flow chart showing a second part of the setting change processing in the first embodiment.

There will be next explained, with reference to flow charts in FIGS. 4 and 5, a processing executed by the controller 11 to implement the above-described setting change operations with the screen transitions. It is noted that while there will be described by way of example a processing that begins with the touch of the copy icon on each screen shown in FIGS. 2A-2C, the touch of the fax icon or the scan icon provides generally the same processing as executed in the case of the touch of the copy icon.

When this setting change processing is started, the controller 11 at S10 stores set values of a default preset-setting group into the RAM. The set values of the default preset-setting group are set values of a preset-setting group corresponding to an icon that is displayed first as an icon in the selected state on the preset-setting-group selection screen shown in FIG. 3A when the copy icon in FIGS. 2A-2C is touched. This RAM is a working memory for temporarily storing contents of the settings. At S20, the controller 11 turns off a flag indicative of whether any of the set values has been changed.

At S30, the controller 11 displays the preset-setting-group selection screen shown in FIG. 3A on the liquid crystal display 16A. The controller 11 at S40 judges whether the user has touched the preset-setting-group icon, at S50 judges whether the user has touched the "Detailed Settings" button, at S60 judges whether the user has touched the "Black" copy start button or the "Color" copy start button, and at S65 judges whether the flag is "ON", in order (S40-S65: NO).

It is noted that the case where the preset-setting-group icon has been touched includes not only a case of the touch of the icon in the selected state on the intermediate area 25B in the preset-setting-group selection screen shown in FIG. 3A but also the touch of one of the icons in the unselected state on the intermediate area 25B in the preset-setting-group selection screen shown in FIG. 3A. When the user touches the icon in the unselected state on the intermediate area 25B, the icons displayed on the intermediate area 25B are scrolled such that the touched icon moves to a center of the intermediate area 25B in the right and left direction, and the icon moved to the center becomes the selected state while each of the other icons becomes or remains in the unselected state.

Instead of or in addition to the judgment on whether the preset-setting-group icon has been touched, the controller 11 may judge whether the icon in the unselected state displayed on the intermediate area 25B at a position other than the center thereof has been moved to the center and become the selected state by the user having slid the input object rightward or leftward on the intermediate area 25B shown in FIG. 3A or, in a case where triangle marks are displayed on the intermediate area 25B, the user having touched one of the marks. In such a case, when the icon in the unselected state is changed to the selected state, the controller 11 executes a processing at S70 which will be described below.

In the judgments at S40-S65, when the preset-setting-group icon is touched (S40: YES), the controller 11 at S70 stores set values of the selected preset-setting group into the RAM, and this setting change processing returns to S40. As a result, the contents of the RAM are updated to those of the preset-setting group responsive to the user operation.

When the "Black" copy start button or the "Color" copy start button is touched (S60: YES), the controller 11 at S80 controls the image reading portion 12 and the image forming portion 13 to start copying based on a combination of the set value stored in the RAM and the black/color setting designated by the touched start button.

It is noted that when the flag is not "ON" at S65 (S65: NO), this setting change processing goes to S40 while when the flag is "ON" (S65: YES), this setting change processing goes to S50. Since this flag is turned off at S20, the controller 11 as described above executes the judgments at S40-S65 in order as long as the flag is "OFF", but if the flag is turned on later in a processing which will be described below, the controller 11 executes the judgments at S50-S65 without executing the judgment at S40.

When the "Detailed Settings" button is touched (S50: YES), this setting change processing goes to the flow chart in FIG. 5 in which the controller 11 at 5110 displays the detailed setting screen as shown in FIG. 3B. The controller 11 at 5120 judges whether the user has touched the setting item, at S130 judges whether the user has touched the "Shortcut Create" button, and at S140 judges whether the user has touched or pressed a setting completed button or a back key in order (S120-S140: NO).

In the judgments at S120-S140, when the setting item is touched (S120: YES), the controller 11 at S150 displays the option display screen shown in FIG. 3C. The controller 11 at S160 judges whether the user has touched one of the set values and at S170 judges whether the user has pressed the back key in order (S160-S170: NO). In the judgment at S160, the controller 11 makes an affirmative decision (YES) when the user touches a set value that is different from the set value displayed on the detailed setting screen in FIG. 3B while the controller 11 makes a negative decision (NO) when the user does not touch the set value that is different from the set value displayed on the detailed setting screen. It is noted that the case where the user does not touch the set value that is different from the set value displayed on the detailed setting screen includes a case where the user has touched the set value displayed on the detailed setting screen.

In the judgments at S160-S170, when the set value is touched (S160: YES), the controller 11 at S180 overwrites the content of the RAM with the changed set value. As a result, the contents of the RAM are updated to those reflective of the change of the settings by the user operation. Following S180, the controller 11 at S190 turns the flag on, and this setting change processing returns to S110.

In the judgments at S160-S170, when the back key is pressed (S170: YES), this setting change processing returns to S110 without going to S180 or S190. In this case, substantially no changes have been made for the option display screen displayed at S150, and the state of the MFP 1 returns to the state before the option display screen is displayed.

In the judgments at S120-S140, when the "Shortcut Create" button is touched (S130: YES), the controller 11 at S200 stores a relationship between the set values at this time and a shortcut icon assigned thereto into the NVRAM, and this setting change processing shown in FIGS. 4 and 5 ends. It is noted that in this case the controller 11 displays the "Favorite" screen shown in FIG. 2C on the liquid crystal display 16A on which the shortcut icon stored at S200 is displayed.

In the judgments at S120-S140, when the setting completed button is touched or the back key is pressed (S140: YES), the controller 11 at S210 judges whether the flag is "ON". When the flag is not "ON" at S210 (S210: NO), this setting change processing goes to S30 in FIG. 4 in which the controller 11 displays the preset-setting-group selection screen shown in FIG. 3A on the liquid crystal display 16A. That is, in a case where substantially no changes have been made though the setting completed button or the back key has been pressed, that is, where the processings at S180-S190 have not been executed, the controller 11 displays the preset-setting-group selection screen again.

When the flag is "ON" at S210 (S210: YES), the controller 11 at S220 displays the preset-setting-group updated screen shown in FIG. 3D on the liquid crystal display 16A, that is, the controller 11 displays the set values stored in the RAM and only the preset-setting group being selected. At S220, the set values of the setting item including the changed set value(s) are displayed on the right portion of the area 31B.

The controller 11 at S230 judges whether the user has pressed the cancel button. When the cancel button is pressed (S230: YES), this setting change processing goes to 810 shown in FIG. 4 to change the state of the MFP 1 to the state just before the start of this setting change processing. When the cancel button is not pressed (S230: NO), this setting change processing goes to S60 shown in FIG. 4. Thus, when the "Black" copy start button or the "Color" copy start button is touched (S60: YES), the controller 11 controls the image reading portion 12 and the image forming portion 13 to start copying based on a combination of the changed set values stored in the RAM and the black/color setting designated by the touched start button.

<Effects>

In the MFP 1 as explained above, when the preset-setting-group selection screen shown in FIG. 3A is displayed, the user can view the icon in the selected state to check the preset-setting group being selected. If the user needs to change the preset-setting group to a desired preset-setting group, the user changes the preset-setting group; otherwise the user does not change the preset-setting group. All the user has to do at this time is to operate the start button (i.e., the "Black" copy start button or the "Color" copy start button in the above-described embodiment) to instruct the image processing mechanism to execute the image processing.

Also, both of the icon in the selected state and the icon(s) in the unselected state are displayed on the preset-setting-group selection screen shown in FIG. 3A, and the user can change the icon in the unselected state to the selected state. On the other hand, the icon in the selected state is displayed but the icon(s) in the unselected state are not displayed on the preset-setting-group updated screen shown in FIG. 3D. This inhibits the user from changing the icon in the unselected state to the selected state.

Therefore, unlike a configuration in which the display and operation as in the preset-setting-group selection screen are allowed even after the set values of the preset-setting group are updated on the detailed setting screen shown in FIG. 3B, it is possible to prevent a trouble in which the updated preset-setting group is replaced with another group by the operation to change the icon in the unselected state to the selected state.

Figure 3D:
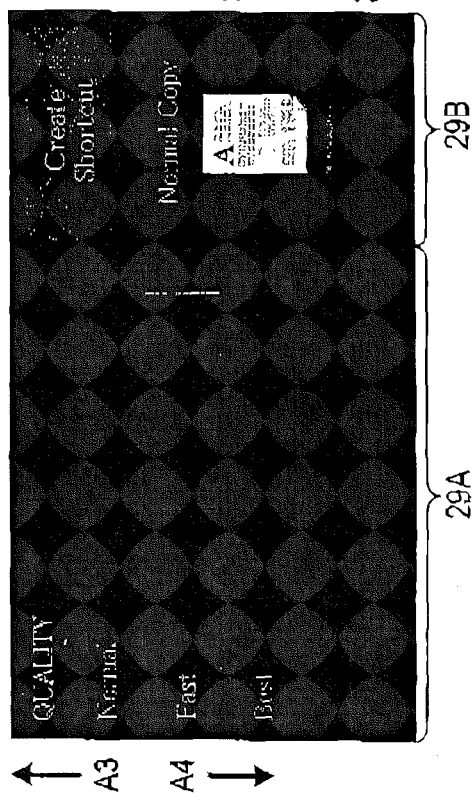

In the above-described MFP 1, after the set values of the preset-setting group are changed on the detailed setting screen, the icon in the selected state and the start button are displayed on the preset-setting-group updated screen at the same positions as in the case of the preset-setting-group selection screen (see FIGS. 3A and 3D). Thus, the same operations as performed for the preset-setting-group selection screen are performed for the preset-setting-group updated screen, that is, the user views the icon in the selected state, checks the preset-setting group being selected, and presses the start button for each of the preset-setting-group selection screen and the preset-setting-group updated screen. Accordingly, the preset-setting-group selection screen and the preset-setting-group updated screen can provide the same operability, allowing the user to perform the operations more intuitively.

In the above-described MFP 1, the start button is not disposed on the detailed setting screen. Thus, the user never operates the start button mistakenly while updating the set value of the preset-setting group on the detailed setting screen. Thus, it is possible to prevent a trouble in which the image processing such as copying, scanning, and facsimile transmission is unintentionally started with the change of the settings being unfinished.

In the above-described MFP 1, the user can select not only any of the plurality of the preset-setting groups but also any of the "Black" copy start button and the "Color" copy start button. Thus, a wide variety of settings can be easily selected without the need to provide preset-setting groups of the number of possible combinations thereof or icons respectively corresponding to these preset-setting groups.

In the above-described MFP 1, even in the case where the detailed setting screen is displayed at S110, when the cancel button is pressed at S230 (S230: YES), the processing returns to S10, and the preset-setting-group selection screen is displayed again at S30. Thus, unlike the case of the screen transition to the preset-setting-group updated screen, the user at S40-S60 can select a desired one of the preset-setting groups by touching the icon corresponding thereto on the preset-setting-group selection screen displayed again at S30.

In the above-described MFP 1, the set values of the preset-setting group corresponding to the single icon displayed on the preset-setting-group updated screen are displayed on the preset-setting-group updated screen. Thus, the user can press the start button on the preset-setting-group updated screen while confirming that the set values have been updated to desired ones.

In the above-described MFP 1, the set values of the preset-setting group are displayed on the preset-setting-group updated screen at the area at which the icon in the unselected state is not displayed on the preset-setting-group updated screen but is displayed on the preset-setting-group selection screen. Thus, the area on the preset-setting-group updated screen can be used effectively to display the set values of the preset-setting group.

In the above-described MFP 1, the set values of the preset-setting group including the updated set value(s) are displayed on the preset-setting-group updated screen. Thus, after the preset-setting-group updated screen is displayed, the user can reliably confirm that the set values are updated to the desired set values.

In the above-described MFP 1, when the operation panel 16 receives the user operation to change the icon in the unselected state to the selected state (S40: YES), the contents of the RAM are overwritten with the set values of the preset-setting group corresponding to the icon to be changed to the selected state, and when the operation panel 16 receives the user operation for the start button, the image processing is executed according to the set values of the preset-setting group stored in the RAM. Thus, the controller 11 can simply read out the set values stored in the RAM to control the image processing without taking the selected preset-setting group into consideration.

[2] Second Embodiment

There will be next explained a second embodiment of the present invention. Many components and processings in the second embodiment are the same as those in the first embodiment, and the following explanation focuses on the different processings. It is noted that the same reference numerals as used in the first embodiment are used to designate the corresponding elements of the second embodiment, and an explanation of which is dispensed with.

<Setting Change Processing>

Figure 6:
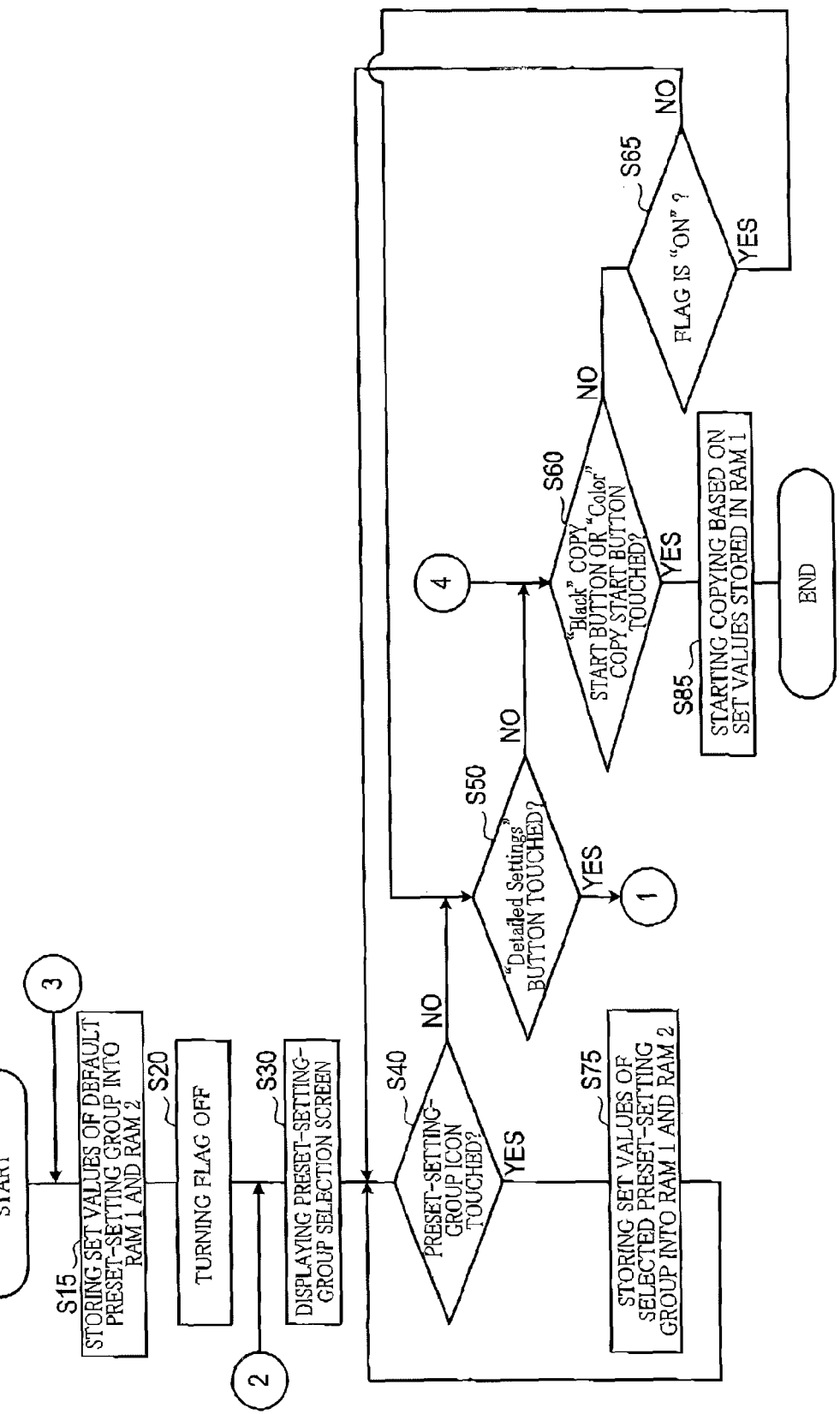
FIG. 6 is a flow chart showing a first part of a setting change processing in a second embodiment.

In the second embodiment, when the setting change processing is started, as shown in FIG. 6, the controller 11 at S15 stores the set values of the default preset-setting group into the RAM 1 and the RAM 2. The set values of the default preset-setting group are set values of a preset-setting group corresponding to an icon that is displayed first as an icon in the selected state on the preset-setting-group selection screen shown in FIG. 3A when the copy icon in FIGS. 2A-2C is touched. These set values of the preset-setting group are stored into the RAM 1 and the RAM 2. That is, while the set values are stored at S10 into the single RAM in the first embodiment, the set values are stored into the two memories, namely, the RAM 1 and the RAM 2 at S15 corresponding to S10.

The controller 11 at S30-S65 executes the same processings as, executed in the first embodiment. In the judgments at S40-S65, when the preset-setting-group icon is touched (S40: YES), the controller 11 at S75 stores set values of the selected preset-setting group into the RAM 1 and the RAM 2, and the processing returns to S40. As a result, the contents of each of the RAM 1 and the RAM 2 are updated to those of the preset-setting group responsive to the user operation. It is noted that the controller 11 can judge whether the preset-setting-group icon has been touched by judging whether the icon in the selected state has been changed to the unselected state while another icon in the unselected state has been changed to the selected state, by the user having slid the input object rightward or leftward on the area 25B shown in FIG. 3A or, in the case where triangle marks are displayed on the intermediate area 25B, the user having touched one of the marks.

When the "Black" copy start button or the "Color" copy start button is touched (S60: YES), the controller 11 at S85 controls the image reading portion 12 and the image forming portion 13 to start copying based on the combination of the set values stored in the RAM 1 and the black/color setting designated by the touched start button.

Figure 7:
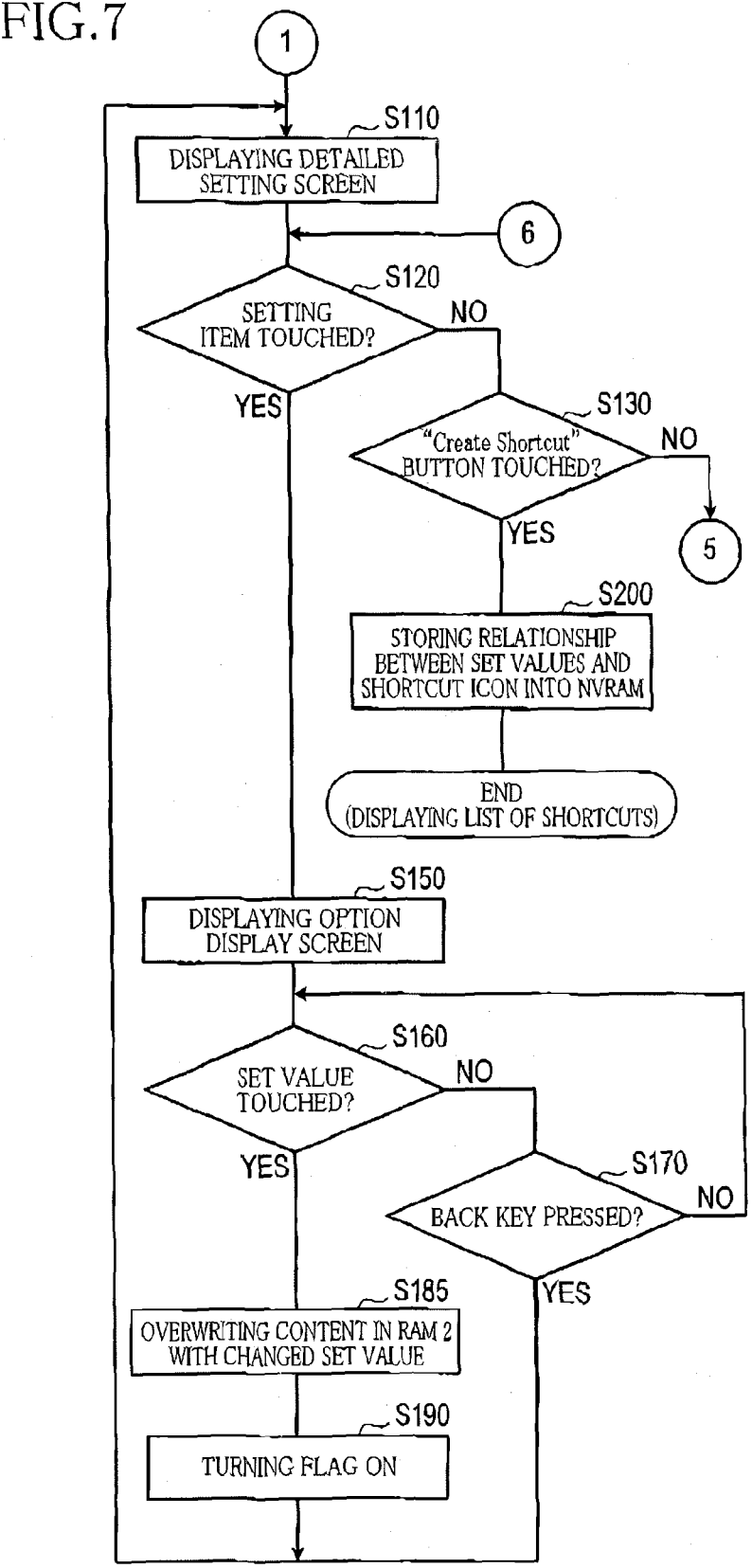
FIG. 7 is a flow chart showing a second part of the setting change processing in the second embodiment.
Figure 8:
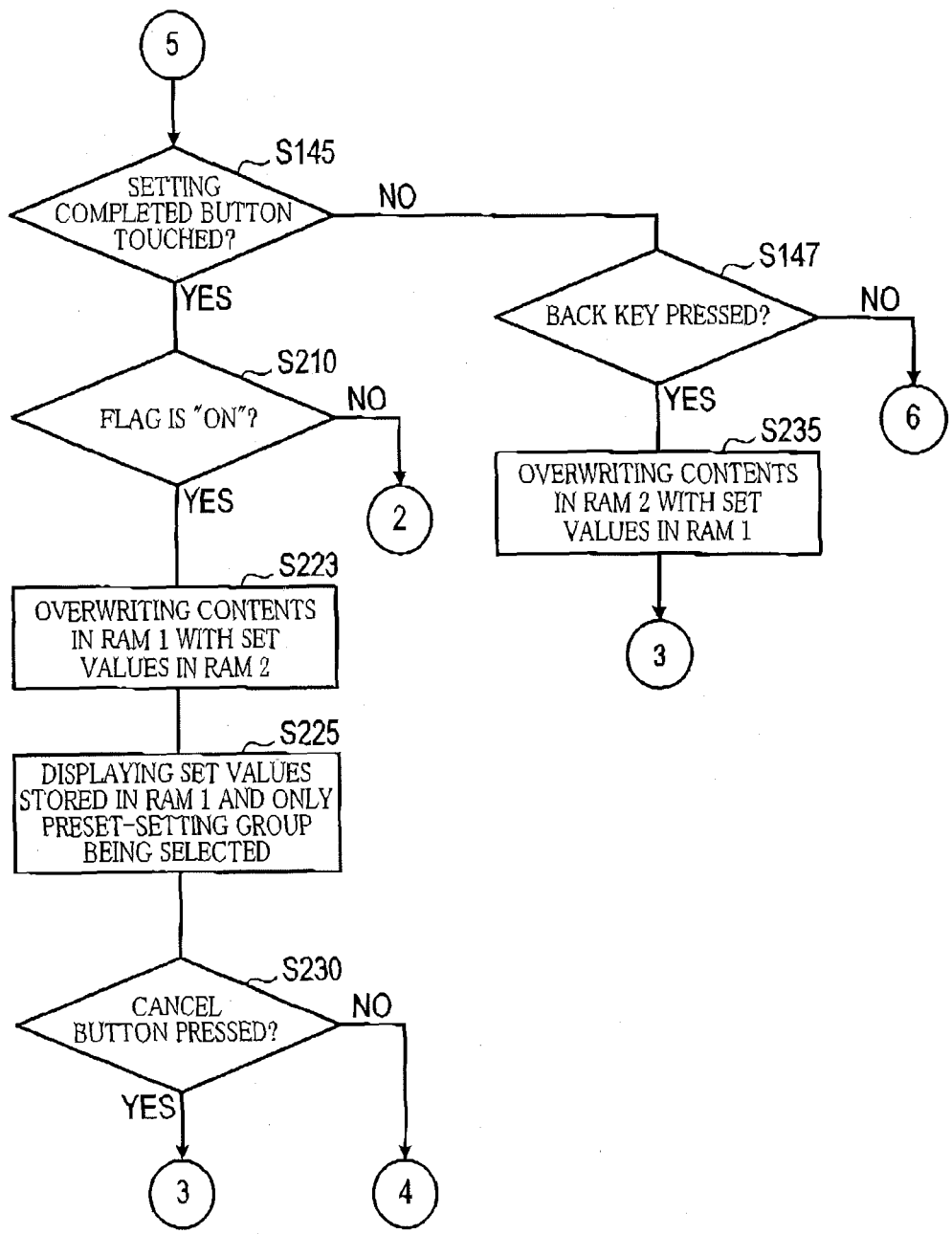
FIG. 8 is a flow chart showing a third part of the setting change processing in the second embodiment.

When the "Detailed Settings" button is touched (S50: YES), this setting change processing goes to processings shown in FIGS. 7 and 8. The controller 11 at S110-S130 executes the same processings as executed in the first embodiment. In this second embodiment, instead of S140 in the first embodiment, the controller 11 separately judges whether the user has touched the setting completed button (S145) and whether the user has pressed the back key (S147). The controller 11 thus executes the judgments at S120-S147 in order (S120-S147: NO).

In the judgments at S120-S147, when the setting item is touched (S120: YES), the controller 11 at S150-S170 and S190 executes the same processings as executed in the first embodiment. When the set value is touched at S160 (S160: YES), the controller 11 at S185 overwrites the content of the RAM 2 with the changed set value. That is, the content of the single RAM is overwritten at S180 in the first embodiment, but in this second embodiment the content of the RAM 1 is kept or unchanged while the content of the RAM 2 is overwritten at S185 instead of S180 in the first embodiment. In the judgment at S160, the controller 11 makes the affirmative decision (YES) when the user touches a set value that is different from the set value displayed on the detailed setting screen in FIG. 3B while the controller 11 makes the negative decision (NO) when the user does not touch the set value that is different from the set value displayed on the detailed setting screen. It is noted that the case where the user does not touch the set value that is different from the set value displayed on the detailed setting screen includes the case where the user has touched the set value displayed on the detailed setting screen.

In the judgments at S120-S147, when the setting completed button is touched (S145: YES), the controller 11 at S210 and S230 executes the same processings as executed in the first embodiment. In this second embodiment, instead of S220 in the first embodiment, the controller 11 at S223 overwrites the contents in the RAM 1 with the set values in the RAM 2 and at S225 displays the set values stored in the RAM 1 and only the preset-setting group being selected. That is the contents of the RAM 1 are overwritten at S223 with the values stored into the RAM 2 at S185, and thereafter the set values stored in the RAM 1 and displayed at S225 become effective.

In the judgments at S120-S147, when the back key is pressed (S147: YES), the controller 11 at S235 overwrites the contents in the RAM 2 with the set values in the RAM 1, and this setting change processing goes to S15. In this second embodiment, the function of the back key is different from that in the first embodiment. That is, in the first embodiment the back key is used for returning the displayed screen to a higher-level screen without changing the updated set values to the original values, but in this second embodiment the back key is used for returning the displayed screen to a higher-level screen with the updated set values being changed to the original values.

<Effects>

As explained above, the MFP 1 in accordance with the second embodiment achieves the same actions and effects as in the first embodiment. In addition, the MFP 1 in accordance with the second embodiment can use the RAM 1 and the RAM 2 to return the changed set values to the original values, which cannot be achieved in the first embodiment.

Therefore, if there is no problem with an increase in the working memory used for the processings, for example, the configuration in the second embodiment helps the user to return the setting values to the former values in a case where the user has changed the setting value(s) mistakenly. On the other hand, if such an operation is not important, the configuration in the first embodiment can be employed to reduce a usage of the working memory.

[3] Other Embodiments

While the embodiments of the present invention have been described above, it is to be understood that the invention is not limited to the details of the illustrated embodiments, but may be embodied with various changes and modifications, which may occur to those skilled in the art, without departing from the spirit and scope of the invention.

For example, in the above-described embodiments, the "Detailed Settings" button, the "Black" copy start button, and the "Color" copy start button are displayed on the liquid crystal display 16A, and the input operation for these buttons is received by the touch panel portion 16C. Nevertheless, any or all of the buttons may be provided on an input device other than the touch panel portion 16C (e.g., an input device having buttons).

In the above-described embodiments, it has been explained that the touch panel portion 16C is of the well-known type such as the electrostatic capacitance type. Other types of the well-known type include an electromagnetic induction type, an infrared type, a surface acoustic wave (SAW) type, and a resistive film type, for example.

While the liquid crystal display 16A and the internally illuminated display 16B share the single touch panel portion 16C in the above-described embodiments, touch panel portions independent of each other may be provided for the liquid crystal display 16A and the internally illuminated display 16B. In such a case, types of the touch panel portions may be the same as or different from each other. For example, this MFP 1 may be configured such that one of the touch panel portions is of a type suitable for an operation with a finger, and the other of the touch panel portions is of a type suitable for an operation with a passive object such as a stylus. Also, this MFP 1 may be configured such that one of the touch panel portions is of a type with a high resolution, and the other of the touch panel portions is of a type with a low resolution and a low cost.

In the above-described embodiments, the touch panel portion 16C as the input device is overlaid on the liquid crystal display 16A as a display device so as to constitute the operation panel 16 having a display function and an input function. However, a single device having the display function and the input function may be used for the operation panel 16.

While the controller 11 executes the judgments at S40-S65 in FIGS. 4 and 6 in order in the above-described embodiments, the judgment at S65 is optional and may be omitted. For example, when the "Black" copy start button or the "Color" copy start button is not touched in S60 (S60: NO), the processing may go to S40 without going to S65 to execute the judgments at S40-S60 in order.

While the content of the RAM is overwritten with the changed set value at S180 in the above-described embodiment, the changed set value may be stored as a new value without overwriting the content of the RAM with the changed set value. In this case, the copying is started after the affirmative decision at S60 (S60: YES) based on the changed set values, the unchanged set values, and the setting designated by the selected start button in combination. Also, in the above-described embodiments, the affirmative decision is obtained at S160 when the user touches the set value that is different from the set value displayed on the detailed setting screen shown in FIG. 3B, but the affirmative decision may be obtained at S160 when the user touches the set value that is the same as the set value displayed on the detailed setting screen. In this case, the controller 11 at S180 or S185 overwrites the contents of the RAM with the same set value.

In the above-described embodiments, the controller 11 and the operation panel 16 of the MFP 1 are configured to perform the various displays and receive the various inputs. Nevertheless, in a case where the MFP 1 and an information processing device such as a personal computer (PC) and a smartphone are connected to each other, a controller, a display, and an input portion of the information processing device can be used to perform the various displays and receive the various inputs.

Specifically, a program is installed on the information processing device for causing the controller of the information processing device connected to the MFP 1 to execute the same processings as indicated in the flow charts shown in FIGS. 4-8, and the controller of the information processing device executes a processing according to the program. As a result, the display and the input portion of the information processing device perform the various displays and receive the various inputs, for example, each of the screens shown in FIG. 2A-3D is displayed on the display of the information processing device. Processings for controlling the components of the MFP 1 such as at S80 and S85 are replaced with processings for controlling the information processing device to send the MFP 1 an instruction to start the copying. When having received the instruction, the controller 11 of the MFP 1 controls the components of the MFP 1.

It should be understood that while there has been explained the changes of the settings for the copying function in the above-described embodiments, changes of the settings for another function can also be performed using a user interface that is similar to that used in the above-described embodiments.

While the MFP 1 having the facsimile function, the scanning function, the copying function, and so on is employed in the above-described embodiments, the present invention is applicable to a printer, an image scanner, a facsimile machine, and other devices each having a single function. Also, even in a case where the information processing device such as the personal computer (PC) and the smartphone are used as the display and the input portion, the information processing device can control such single-function devices. In this case, the information processing device uses the program for executing the same processings as indicated in the flow charts shown in FIGS. 4-8 to perform the displays and inputs for the single-function devices.

What is claimed is:

1. An image processor, comprising:
an image processing mechanism including at least one of an image reading mechanism configured to read an image formed on a document and an image forming mechanism configured to form an image on a recording medium;
a display configured to display an image thereon;
a preset-setting-group storage device configured to store a plurality of preset-setting groups each of which is a group of a plurality of settings for image processing executed by the image processing mechanism;
a preset-setting-group-selection-screen display controller configured to control the display to display a plurality of icons respectively corresponding to the plurality of preset-setting groups such that one icon of the plurality of icons is displayed in a manner indicative of a selected state while at least one icon of the plurality of icons other than the one icon is displayed in a manner that is indicative of an unselected state and that is different from the manner indicative of the selected state;
a selected-state change section configured to control the display such that a display manner of the one icon is changed from the manner indicative of the selected state to the manner indicative of the unselected state when having received a user operation for instructing that a display manner of one icon having been displayed in the manner indicative of the unselected state be changed to the manner indicative of the selected state;
a detailed-setting-screen display controller configured, when having received a user operation for displaying set values of one of the plurality of preset-setting groups, to control the display to display a detailed setting screen that contains set values of a preset-setting group corresponding to the icon having been displayed in the manner indicative of the selected state;
a set-value storage controller configured, when having received a user operation for changing at least one of the set values of the preset-setting group displayed on the display, to store the at least one changed set value into a storage unit;
a preset-setting-group-updated-screen display controller configured, when the set-value storage controller has stored the at least one changed set value, to:
control the display to display the one icon displayed by the preset-setting-group-selection-screen display controller in the manner indicative of the selected state; and
control the display not to display the at least one icon displayed by the preset-setting-group-selection-screen display controller in the manner indicative of the unselected state; and
an image-processing-mechanism controller configured, when having received a user operation for a start button in the state in which the one icon is displayed on the display by the preset-setting-group-updated-screen display controller, to execute the image processing by controlling the image processing mechanism according to the at least one changed set value and at least one original set value among the set values of the preset-setting group corresponding to the one icon displayed on the display, wherein each of the at least one original set value is a value which has not been changed by the user operation for changing at least one of the set values.

2. The image processor according to claim 1,
wherein the image processing mechanism is capable of executing a plurality of types of the image processing,
wherein each of the plurality of preset-setting groups is stored in the preset-setting-group storage device for a corresponding one of the plurality of types of the image processing,
wherein the image processing mechanism is configured to control the display to display a plurality of icons respectively corresponding to the plurality of types of the image processing,
wherein, when one of the plurality of icons respectively corresponding to the plurality of types of the image processing is selected, the preset-setting-group-selection-screen display controller controls the display to display a plurality of icons respectively corresponding to the plurality of preset-setting groups for one of the plurality of types of the image processing which one corresponds to the selected one of the plurality of icons, such that one icon of the plurality of icons is displayed in the manner indicative of the selected state while at least one icon of the plurality of icons other than the one icon is displayed in the manner indicative of the unselected state.

3. The image processor according to claim 2,
wherein the plurality of types of the image processing include at least two of facsimile transmission, copying, and scanning.

4. The image processor according to claim 1, wherein the image-processing-mechanism controller is configured, when having received a user operation for a start button in the state in which the plurality of icons are displayed on the display by the preset-setting-group-selection-screen display controller, to execute the image processing by controlling the image processing mechanism according to the set values of the preset-setting group corresponding to the icon displayed in the manner indicative of the selected state.

5. The image processor according to claim 1, further comprising a change judging unit configured to judge whether any of the set values of the preset-setting group displayed on the display by the detailed-setting-screen display controller has been changed in response to the user operation,
wherein, when the change judging unit judges that any of the set values of the preset-setting group has been changed, the preset-setting-group-updated-screen display controller controls the display to display an icon corresponding to a preset-setting group having the changed set value and not to display at least one icon other than the displayed icon, and
wherein, when the change judging unit judges that any of the set values of the preset-setting group has not been changed, the preset-setting-group-selection-screen display controller controls the display to display (i) the icon corresponding to the preset-setting group displayed on the display by the detailed-setting-screen display controller and (ii) at least one icon of the plurality of icons other than the icon corresponding to the preset-setting group.

6. The image processor according to claim 1,
wherein the display is capable of receiving a user operation for an image displayed on the display, and
wherein the user operation for the image displayed on the display comprises a user operation for displaying details of the preset-setting group and a user operation for updating the set values of the preset-setting group displayed on the detailed setting screen.

7. The image processor according to claim 1, wherein the start button is displayed on the display.

8. The image processor according to claim 1,
wherein the preset-setting-group-selection-screen display controller is configured to control the display to display the start button in addition to the plurality of icons, and
wherein the preset-setting-group-updated-screen display controller is configured to control the display to display the start button and the one icon at the same positions as the start button and the one icon displayed in the manner indicative of the selected state by the preset-setting-group-selection-screen display controller.

9. The image processor according to claim 1, wherein the detailed-setting-screen display controller is configured to control the display not to display the start button and control the display to display the set values of the preset-setting group corresponding to the icon having been displayed in the manner indicative of the selected state.

10. The image processor according to claim 1,
wherein a plurality of start buttons each as the start button are displayed on the display, and different set values for setting of the image processing executed by the image processing mechanism are assigned to the respective start buttons, and
wherein the image-processing-mechanism controller is configured to control the image processing mechanism to execute the image processing according to (i) the set values of the preset-setting group corresponding to the icon having been displayed in the manner indicative of the selected state and (ii) the set value assigned to one of the start buttons which has been operated by a user.

11. The image processor according to claim 1, wherein, when having received a user operation for not changing the set values of the preset-setting group displayed on the display or when the user operation for changing at least one of the set values of the preset-setting group displayed on the display has been received but the set values are the same before and after the change, the preset-setting-group-selection-screen display controller controls the display to display the plurality of icons respectively corresponding to the plurality of preset-setting groups such that the one icon is displayed in the manner indicative of the selected state while the other icons are displayed in the manner indicative of the unselected state.

12. The image processor according to claim 1, wherein the preset-setting-group-updated-screen display controller is configured to control the display to display (a) the one icon displayed by the preset-setting-group-selection-screen display controller in the manner indicative of the selected state and (b) at least one of the at least one original set value and the at least one changed set value among the set values of the preset-setting group corresponding to the one icon displayed by the preset-setting-group-selection-screen display controller in the manner indicative of the selected state.

13. The image processor according to claim 12, wherein the preset-setting-group-updated-screen display controller is configured to control the display to display at least one of the at least one original set value and the at least one changed set value at an area at which the icon displayed by the preset-setting-group-selection-screen display controller in the manner indicative of the unselected state had been displayed, wherein both of the at least one original set value and the at least one changed set value are among the set values of the preset-setting group corresponding to the one icon displayed by the preset-setting-group-selection-screen display controller in the manner indicative of the selected state.

14. The image processor according to claim 12, wherein the preset-setting-group-updated-screen display controller is configured to control the display to display the at least one changed set value.

15. The image processor according to claim 1, further comprising a set-value overwriting control section configured to:
store, into a temporal storage device, the set values of the preset-setting group corresponding to the icon having been displayed by the preset-setting-group-selection-screen display controller in the manner indicative of the selected state; and thereafter
overwrite the set values stored in the temporal storage device with the set values of the preset-setting group corresponding to the icon whose display manner has been changed by the selected-state change section to the manner indicative of the selected state,
wherein the image-processing-mechanism controller is configured to control the image processing mechanism to execute the image processing according to the set values of the preset-setting group stored in the temporal storage device.

16. An image processor, comprising:
an image processing mechanism including at least one of an image reading mechanism configured to read an image formed on a document and an image forming mechanism configured to form an image on a recording medium;
a display configured to display an image thereon;
a preset-setting-group storage device configured to store a plurality of preset-setting groups each of which is a group of a plurality of settings for image processing executed by the image processing mechanism;
a preset-setting-group-selection-screen display controller configured to control the display to display a plurality of icons respectively corresponding to the plurality of preset-setting groups such that one icon of the plurality of icons is displayed in a manner indicative of a selected state while at least one icon of the plurality of icons other than the one icon is displayed in a manner that is indicative of an unselected state and that is different from the manner indicative of the selected state;
a selected-state change section configured to control the display such that a display manner of the one icon is changed from the manner indicative of the selected state to the manner indicative of the unselected state when having received a user operation for instructing that a display manner of one icon having been displayed in the manner indicative of the unselected state be changed to the manner indicative of the selected state;
a detailed-setting-screen display controller configured, when an output signal for displaying set values of one of the plurality of preset-setting groups is outputted, to control the display to display set values of a preset-setting group corresponding to the icon having been displayed in the manner indicative of the selected state;
a set-value storage controller configured, when an output signal for changing at least one of the set values of the preset-setting group displayed on the display is outputted, to store the at least one changed set value into a storage unit;
a preset-setting-group-updated-screen display controller configured, when the set-value storage controller has stored the at least one changed set value, to:

control the display to display the one icon displayed by the preset-setting-group-selection-screen display controller in the manner indicative of the selected state; and control the display not to display the at least one icon displayed by the preset-setting-group-selection-screen display controller in the manner indicative of the unselected state; and an image-processing-mechanism controller configured, when an output signal indicating a user operation for a start button is outputted in the state in which the one icon is displayed on the display by the preset-setting-group-updated-screen display controller, to execute the image processing by controlling the image processing mechanism according to the at least one changed set value and at least one original set value among the set values of the preset-setting group corresponding to the one icon displayed on the display, wherein each of the at least one original set value is a value which has not been changed by the user operation for changing at least one of the set values.

17. The image processor according to claim 16, wherein, when an output signal for not changing the set values of the preset-setting group displayed on the display is outputted or when an output signal for changing at least one of the set values of the preset-setting group displayed on the display is outputted but the set values are the same before and after the change, the preset-setting-group-selection-screen display controller controls the display to display the plurality of icons respectively corresponding to the plurality of preset-setting groups such that the one icon is displayed in the manner indicative of the selected state while the other icons are displayed in the manner indicative of the unselected state.

18. A non-transitory storage medium storing a program executed by a computer of an image processor comprising an image processing mechanism including at least one of an image reading mechanism configured to read an image formed on a document and an image forming mechanism configured to form an image on a recording medium, the program designed to have the computer function as:

a preset-setting-group storage device configured to store a plurality of preset-setting groups each of which is a group of a plurality of settings for image processing executed by the image processing mechanism;

a preset-setting-group-selection-screen display controller configured to control a display to display a plurality of icons respectively corresponding to the plurality of preset-setting groups such that one icon of the plurality of icons is displayed in a manner indicative of a selected state while at least one icon of the plurality of icons other than the one icon is displayed in a manner that is indicative of an unselected state and that is different from the manner indicative of the selected state;

a selected-state change section configured to control the display such that a display manner of the one icon is changed from the manner indicative of the selected state to the manner indicative of the unselected state when having received a user operation for instructing that a display manner of one icon having been displayed in the manner indicative of the unselected state be changed to the manner indicative of the selected state;

a detailed-setting-screen display controller configured, when having received a user operation for displaying set values of one of the plurality of preset-setting groups, to control the display to display set values of a preset-setting group corresponding to the icon having been displayed in the manner indicative of the selected state;

a set-value storage controller configured, when having received a user operation for changing at least one of the set values of the preset-setting group displayed on the display, to store the at least one changed set value into a storage unit;

a preset-setting-group-updated-screen display controller configured, when the set-value storage controller has stored the at least one changed set value, to:

control the display to display the one icon displayed by the preset-setting-group-selection-screen display controller in the manner indicative of the selected state; and control the display not to display the at least one icon displayed by the preset-setting-group-selection-screen display controller in the manner indicative of the unselected state; and an image-processing-mechanism controller configured, when having received a user operation for a start button in the state in which the one icon is displayed on the display by the preset-setting-group-updated-screen display controller, to execute the image processing by controlling the image processing mechanism according to the at least one changed set value and at least one original set value among the set values of the preset-setting group corresponding to the one icon displayed on the display, wherein each of the at least one original set value is a value which has not been changed by the user operation for changing at least one of the set values.

19. A non-transitory storage medium storing a program executed by a computer of an image processor comprising an image processing mechanism including at least one of an image reading mechanism configured to read an image formed on a document and an image forming mechanism configured to form an image on a recording medium, the program designed to have the computer function as:

a preset-setting-group storage device configured to store a plurality of preset-setting groups each of which is a group of a plurality of settings for image processing executed by the image processing mechanism;

a preset-setting-group-selection-screen display controller configured to control a display to display a plurality of icons respectively corresponding to the plurality of preset-setting groups such that one icon of the plurality of icons is displayed in a manner indicative of a selected state while at least one icon of the plurality of icons other than the one icon is displayed in a manner that is indicative of an unselected state and that is different from the manner indicative of the selected state;

a selected-state change section configured to control the display such that a display manner of the one icon is changed from the manner indicative of the selected state to the manner indicative of the unselected state when having received a user operation for instructing that a display manner of one icon having been displayed in the manner indicative of the unselected state be changed to the manner indicative of the selected state;

a detailed-setting-screen display controller configured, when an output signal for displaying set values of one of the plurality of preset-setting groups is outputted, to control the display to display set values of a preset-setting group corresponding to the icon having been displayed in the manner indicative of the selected state;

a set-value storage controller configured, when an output signal for changing at least one of the set values of the preset-setting group displayed on the display is outputted, to store the at least one changed set value into a storage unit;

a preset-setting-group-updated-screen display controller configured, in a case where the set-value storage controller has stored the at least one changed set value, to:
control the display to display the one icon displayed by the preset-setting-group-selection-screen display controller in the manner indicative of the selected state; and
control the display not to display the at least one icon displayed by the preset-setting-group-selection-screen display controller in the manner indicative of the unselected state; and
an image-processing-mechanism controller configured, when an output signal indicating a user operation for a start button is outputted in the state in which the one icon is displayed on the display by the preset-setting-group-updated-screen display controller, to execute the image processing by controlling the image processing mechanism according to the at least one changed set value and at least one original set value among the set values of the preset-setting group corresponding to the one icon displayed on the display, wherein each of the at least one original set value is a value which has not been changed by the user operation for changing at least one of the set values.

* * * * *